UNITED STATES PATENT OFFICE.

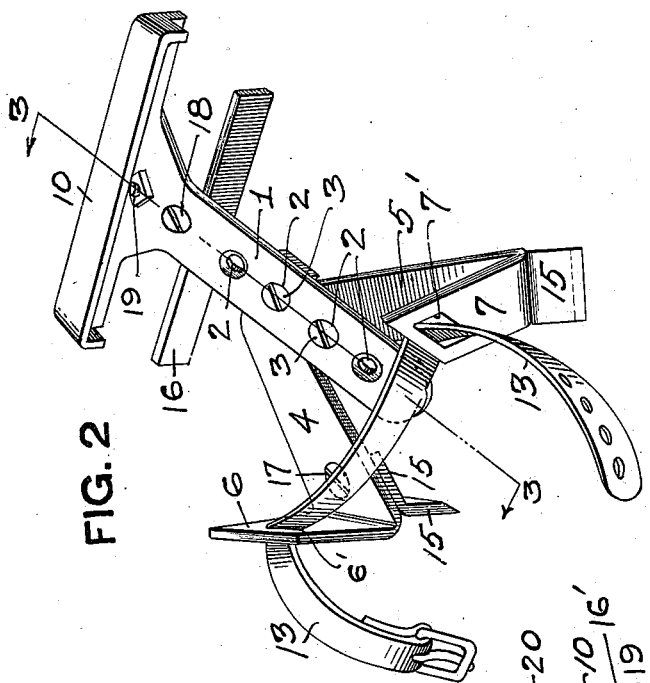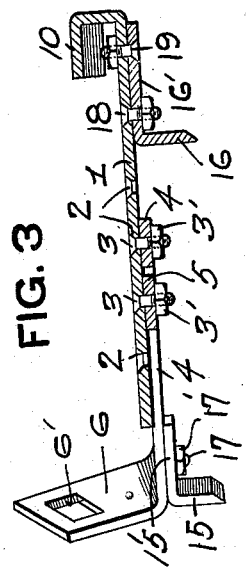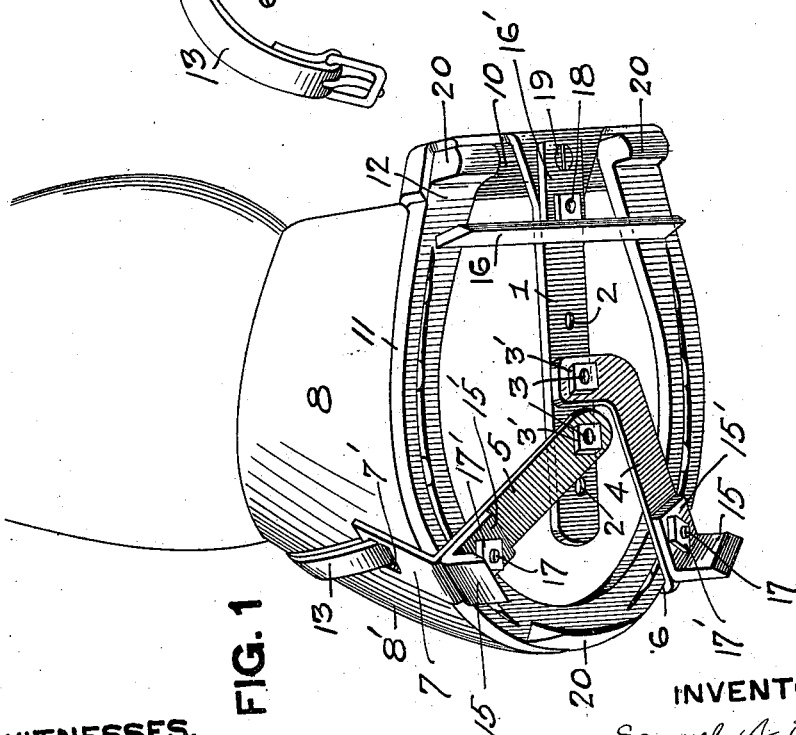

SAMUEL A. FRITZ, OF PITTSBURG, PENNSYLVANIA.

ANTISLIPPING ATTACHMENT FOR HORSESHOES.

981,632.  Specification of Letters Patent.  Patented Jan. 17, 1911.

Application filed September 6, 1910. Serial No. 580,671.

*To all whom it may concern:*

Be it known that I, SAMUEL A. FRITZ, a resident of Pittsburg, in the county of Allegheny and State of Pennsylvania, have invented a new and useful Improvement in Antislipping Attachments for Horseshoes; and I do hereby declare the following to be a full, clear, and exact description thereof.

My invention relates to an attachment for horses' hoofs supplementary to the usual shoes worn. Its object is to provide an improved device of this nature to be used in slippery weather on horses which are used on asphalt and other slippery pavements, and which can be attached and removed quickly and will effectively prevent the horses slipping on the pavement. It is well known that such slipping by horses is the cause of numerous accidents both to the horse and to the occupants of vehicles which they draw. The ordinary horse-shoe calks which are designed to prevent such slipping and usually admit of sharpening, become rapidly worn down, especially after the ice and snow have been removed from the pavement by cleaning or melting. It is therefore extremely inconvenient to keep the horseshoes continually in condition to prevent the horse slipping.

I am aware that various means for preventing horses slipping have been tried, including a chain device which fastens over the horse's hoof. A device of this nature, in my opinion is liable to breakages due to the wearing out of any one link in the chain, and besides furnishes little assistance to the horses when drawing a load up hill as the links of the chain then slip along the pavement.

To these ends my invention consists, generally stated, in a supplementary device of the class described to be used in connection with the ordinary shoe and comprising toe and heel calks and means for holding the same and for attaching the same to the horse's hoof.

It consists preferably in a main trunk or longitudinal member which carries the rear or heel calk and arms, preferably adjustable and pivoted thereto and carrying the forward or toe calks respectively, together with attaching means preferably comprising a pair of clamps attached to said arms respectively and joined over the forward portion of the horse's hoof by a strap, together with a transverse clip fitting over the heels of the horse-shoe.

In the drawings Figure 1 is a perspective view showing my invention as applied to a horse's hoof and horse-shoe. Fig. 2 is another perspective view taken at a different angle illustrating my invention and Fig. 3 is a longitudinal section on the line 3—3 Fig. 2.

As illustrated, the spine or trunk member 1 is provided with the holes 2 through which extend the studs or screws 3 to which the arms 4 and 5 are pivoted, respectively. The screws 3 are each fastened by a suitable nut 3', as shown. The arms 4 and 5 are provided with the upwardly projecting clamps 6 and 7 preferably integral therewith, respectively. The clamps 6 and 7 are set at an inward angle or incline so as to approximately fit the average shape of the horse's hoof 8 although it will be understood that the said clamps 6 and 7 may be bent or adjusted or manufactured in different sizes so as to be more accurately attachable to any particular hoof.

The spine or trunk 1 carries at its rear end the transverse clip 10, which may be pressed integral therewith, as shown. The clip or bracket 10 is adapted to fit over the heels 12 of the horse-shoe 11.

In attaching the device of my invention to a horse's hoof, the transverse clip 10 is first slipped over the heel of the horse-shoe 11, the pivoted arms 4 and 5 being spread, or extended substantially sidewise. The arms 4 and 5 are then moved forwardly until the clamps 6 and 7 abut against the toe portion 8' of the hoof. The strap 13 shown, which extends through the holes 6' and 7', respectively, is then buckled across the toe portion 8' of the hoof 8, and the anti-slipping device thereby securely fastened in position.

The holding or anti-slipping means comprises preferably the forward calks 15 carried by the arms 4 and 5 respectively, and the rear calk or cross bar 16 carried by the trunk or spine 1. The said calks are preferably constructed removable, the forward calks 15 being provided with the arms 15' which are attached by the bolts or screws 17 and nuts 17' to the arms 4 and 5, respectively. I do not intend to limit myself to this particular mode of attachment, however, as my invention obviously admits of numerous modifications within its spirit. The heel calk or cross bar 16 is shown as attached to the spine 1 by the arm portion 16′ and screws 18 and 19.

By means of the holes 2 and studs or screws 3 the position of the arms 4 and 5 may be quickly changed. I thereby provide means permitting a suitable arrangement of adjustment in each device to accommodate it to variations in sizes of horse's hoofs. The device may also be sold either as a whole or in parts, so that a new arm can be obtained and set in place where the anti-slipping attachment cannot be made to fit a hoof or shoe of a peculiar nature.

As soon as the ordinary shoe calks 20 have become worn down or dull, or before this occurs, as a measure of safety in slippery weather, the anti-slipping attachment of my invention can be quickly applied to the horse's hoof and fastened into position. As the calks on the same are removable they can be kept in sharpened condition easily or replaced when worn out.

What I claim is:

1. A device of the character specified comprising a longitudinal member provided with means for engagement with the rear portions of the horse-shoe, arms pivoted to said member and provided with calks, and tying means adapted to connect said arms across the toe of the horse's hoof and thereby fasten the device in place.

2. A device of the character specified comprising a longitudinal member provided at its rear end with a clip adapted to fit over the heels of the horse-shoe, arms adjustably pivoted to said member and provided with calks and tying means to fasten said arms across the toe of said horse's hoof and thereby hold the supporting clip in place.

3. A device of the character specified comprising a longitudinal spine member having a transversely extending clip adapted to fit over the heels of the horse-shoe, and a transverse calk extending across the hoof and horse-shoe and arms pivotally connected to said spine member and provided with tying means for fastening the same across the toe of the horse's hoof.

4. A device of the character specified comprising a longitudinal member adapted to engage with and be supported by the heels of the horse-shoe, arms pivoted to said member provided with removable calks and having clamps adapted to bear upon the toe portion of the horse's hoof and a strap connecting said arms across said toe portion.

5. A device of the character described, comprising a longitudinal member or spine, a clip attached to the same and adapted to fit over the heels of the horse-shoe and a removable transverse calk or cross bar fastened to said spine, adjustable arms pivoted to said spine and each provided with a clamp adapted to fit the toe of the horse's hoof, removable calks carried by said arms, respectively, and means for fastening said clamps in position on the horse's hoof.

6. A device of the character described, comprising a longitudinal member or spine, a transverse clip extending across the rear of the same and adapted to fit over the heels of the horse-shoe, holes in said spine, adjustable arms each provided with a stud adapted to be positioned in said holes respectively, calks carried by said arms and means for attaching said arms to the horse's hoof.

7. A device of the character described, comprising a longitudinal member or spine, and a transverse clip extending across the rear of the same and adapted to fit over the heels of the horse-shoe, holes in said spine, adjustable arms each provided with a stud adapted to be positioned in said holes respectively, calks carried by said arms, and a transverse calk carried at the rear portion of said spine, clamps carried by said arms, respectively, and arranged at a suitable angle to fit the toe of the horse's hoof, and a strap connecting said clamps.

In testimony whereof, I the said SAMUEL A. FRITZ have hereunto set my hand.

SAMUEL A. FRITZ.

Witnesses:
GEO. B. BLEMING,
J. R. KELLER.